(12) United States Patent
Wouters

(10) Patent No.: US 10,730,229 B2
(45) Date of Patent: Aug. 4, 2020

(54) METHOD AND SYSTEM FOR PRODUCING A PRE-INSULATED PIPE, AND PRE-INSULATED PIPE

(71) Applicant: Watts Water Technologies, Inc., North Andover, MA (US)

(72) Inventor: Marc Wouters, Leuven (BE)

(73) Assignee: Watts Water Technologies, Inc., North Andover, MA (US)

( * ) Notice: Subject to any disclaimer, the term of this patent is extended or adjusted under 35 U.S.C. 154(b) by 329 days.

(21) Appl. No.: 15/758,238
(22) PCT Filed: Sep. 9, 2016
(86) PCT No.: PCT/IB2016/001270
§ 371 (c)(1),
(2) Date: Mar. 7, 2018
(87) PCT Pub. No.: WO2017/042621
PCT Pub. Date: Mar. 16, 2017

(65) Prior Publication Data
US 2018/0243973 A1    Aug. 30, 2018

(30) Foreign Application Priority Data

Sep. 11, 2015  (BE) .................................. 2015/5570
Mar. 1, 2016   (BE) .................................. 2016/5144

(51) Int. Cl.
| | | |
|---|---|---|
| B29C 63/00 | (2006.01) |
| B32B 1/00 | (2006.01) |
| B32B 3/00 | (2006.01) |
| B32B 5/00 | (2006.01) |
| B32B 27/00 | (2006.01) |

(Continued)

(52) U.S. Cl.
CPC .......... *B29C 63/34* (2013.01); *B29C 63/0017* (2013.01); *B29C 63/065* (2013.01);
(Continued)

(58) Field of Classification Search
CPC ... B29C 63/00; B29C 63/001; B29C 63/0017; B29C 63/06; B29C 63/065; B29C 63/30;
(Continued)

(56) References Cited

U.S. PATENT DOCUMENTS

| | | | | |
|---|---|---|---|---|
| 4,144,111 A | * | 3/1979 | Schaerer .................. | B32B 27/34 |
| | | | | 156/187 |
| 10,208,885 B2 | * | 2/2019 | Roberts ..................... | B32B 1/08 |
| 2015/0053293 A1 | * | 2/2015 | Ophaug ................ | B29C 48/903 |
| | | | | 138/33 |

FOREIGN PATENT DOCUMENTS

| | | |
|---|---|---|
| EP | 1036643 | 9/2000 |
| FR | 2262248 | 9/1975 |

* cited by examiner

*Primary Examiner* — Jacob T Minskey
*Assistant Examiner* — Matthew Hoover
(74) *Attorney, Agent, or Firm* — Marcus C. Dawes

(57) ABSTRACT

A method for producing a pre-insulated pipe, comprising inserting a length of jacket pipe (10) into a guide channel (110) having a front end (111) and a rear end (112); fixing said length of jacket pipe (10) in said guide channel (110); providing a first end (21) of a length of insulated inner piping (20), said length of insulated inner piping comprising a length of inner pipe surrounded by at least one layer of compressible insulation material (26); inserting, at said front end of said guide channel, into said length of jacket pipe, said first end of said length of insulated inner piping (20); applying an overpressure at least in an interior of said length of jacket pipe (10), around the inserted first end of the length of insulated inner piping (20); and moving said first end of said length of insulated inner piping (20) to said rear end of said guide channel (110); wherein said overpressure is such that said at least one layer of insulation material (26) is radially compressed; removing said overpressure to fix said length of insulated inner piping (20) in said length of jacket pipe (10) in order to form a pre-insulated pipe.

20 Claims, 7 Drawing Sheets

(51) Int. Cl.
*F16L 9/00* (2006.01)
*F16L 59/00* (2006.01)
*B29C 63/34* (2006.01)
*F16L 59/14* (2006.01)
*B32B 5/18* (2006.01)
*B32B 27/06* (2006.01)
*B32B 27/32* (2006.01)
*B29C 63/06* (2006.01)
*B32B 1/08* (2006.01)
*B32B 3/30* (2006.01)
*F16L 9/19* (2006.01)
*B32B 3/26* (2006.01)

(52) U.S. Cl.
CPC ................. *B32B 1/00* (2013.01); *B32B 1/08* (2013.01); *B32B 3/26* (2013.01); *B32B 3/30* (2013.01); *B32B 5/18* (2013.01); *B32B 27/065* (2013.01); *B32B 27/32* (2013.01); *F16L 9/19* (2013.01); *F16L 59/143* (2013.01); *B29K 2995/0015* (2013.01); *B32B 2266/025* (2013.01); *B32B 2266/0278* (2013.01); *B32B 2266/08* (2013.01); *B32B 2307/304* (2013.01); *B32B 2307/7244* (2013.01); *B32B 2307/732* (2013.01); *B32B 2597/00* (2013.01)

(58) Field of Classification Search
CPC .. B29C 63/34; B32B 1/00; B32B 1/08; B32B 3/00; B32B 3/20; B32B 3/26; B32B 3/30; B32B 5/00; B32B 5/10; B32B 5/18; B32B 27/00; B32B 27/06; B32B 27/065; B32B 27/30; B32B 27/32; F16L 9/00; F16L 9/10; F16L 9/19; F16L 59/00; F16L 59/10; F16L 59/14; F16L 59/143
See application file for complete search history.

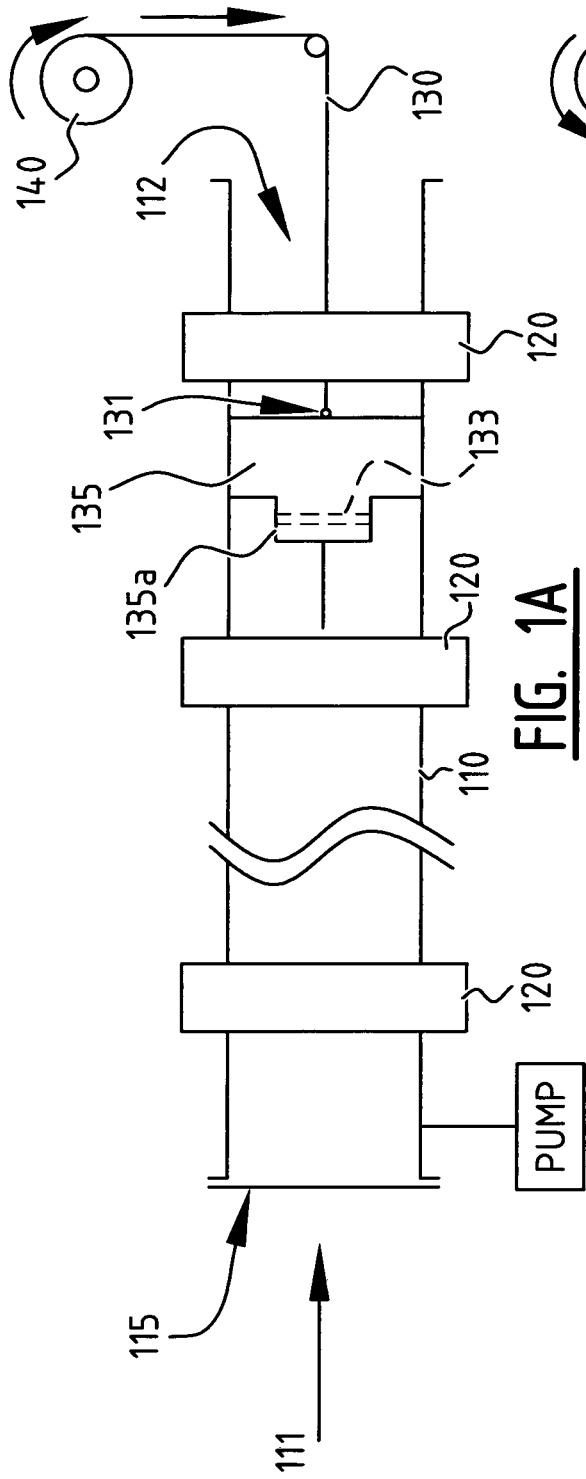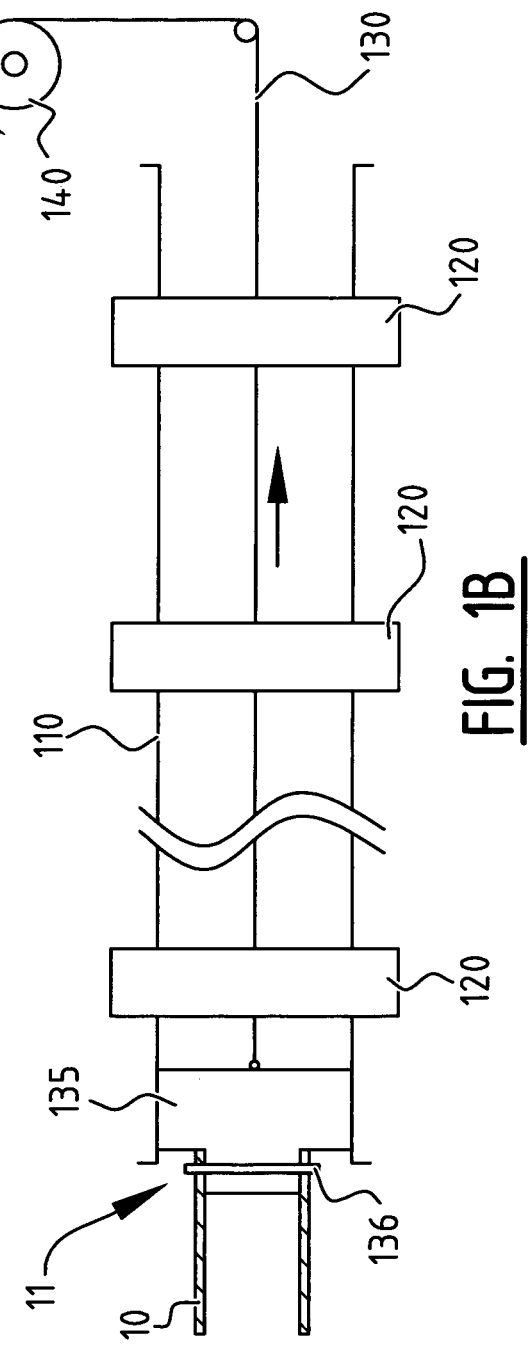

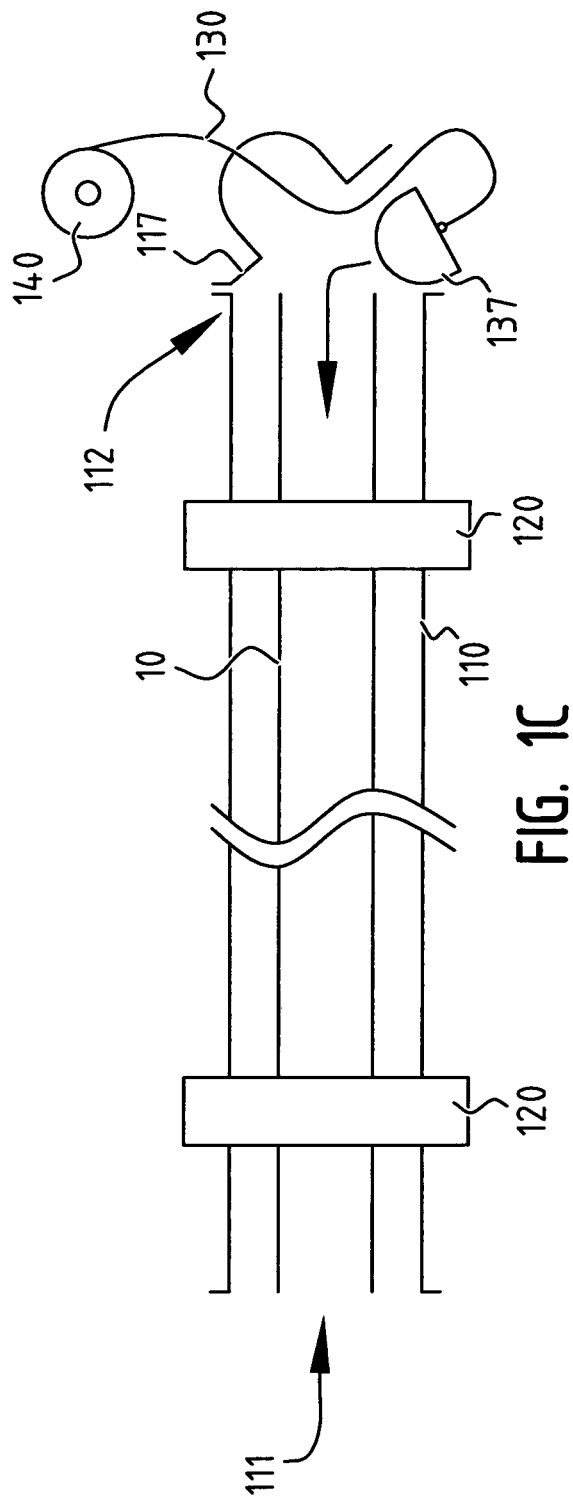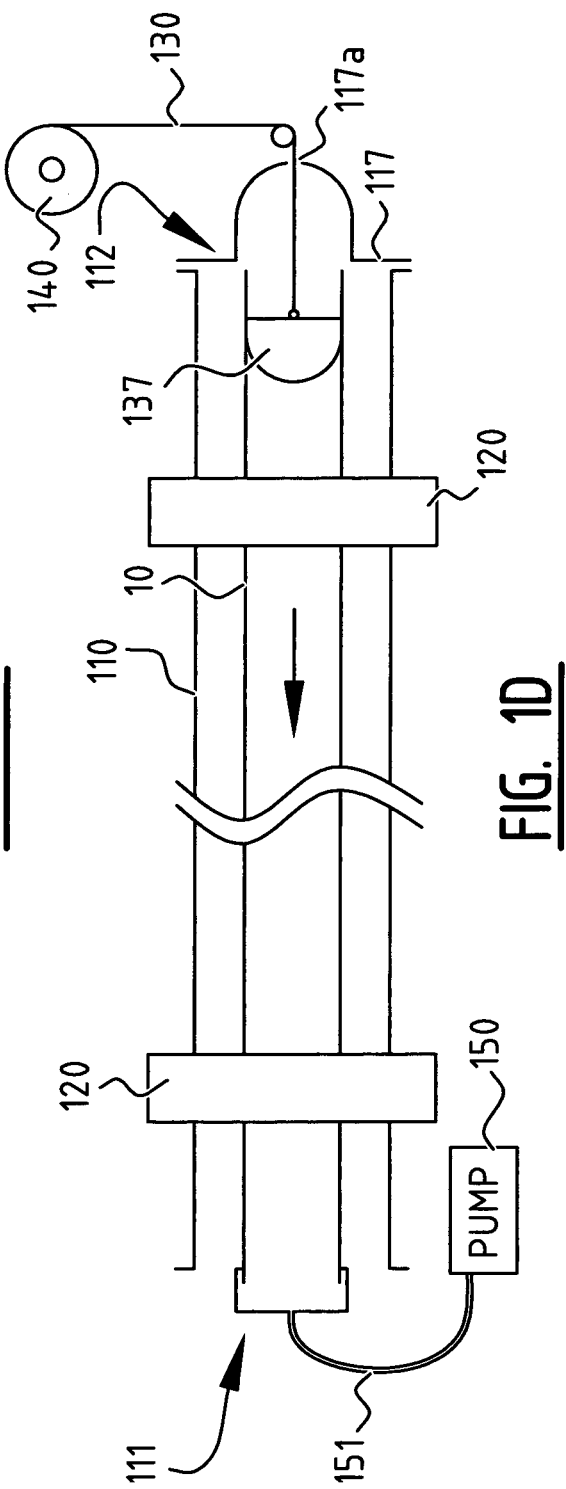

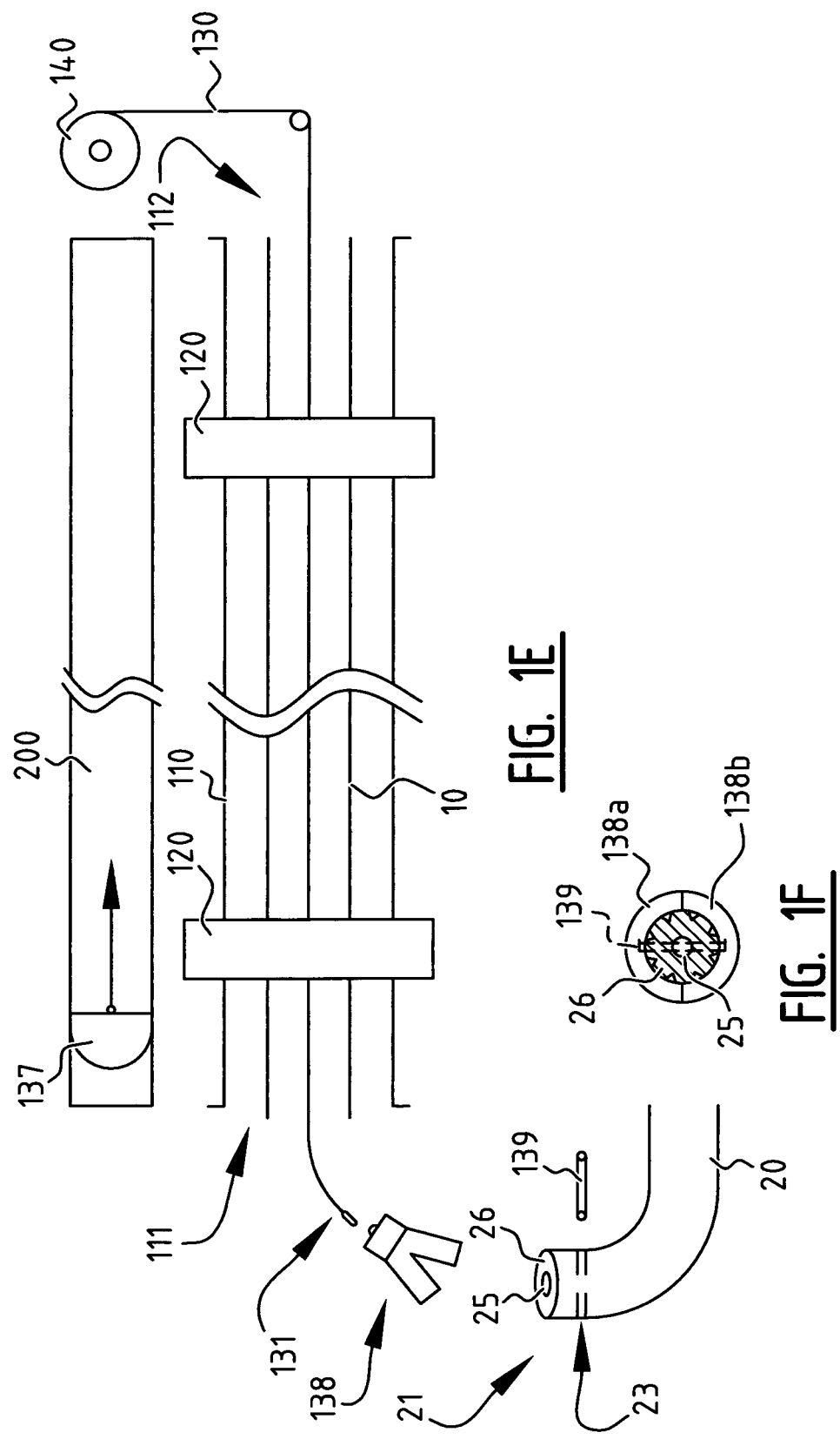

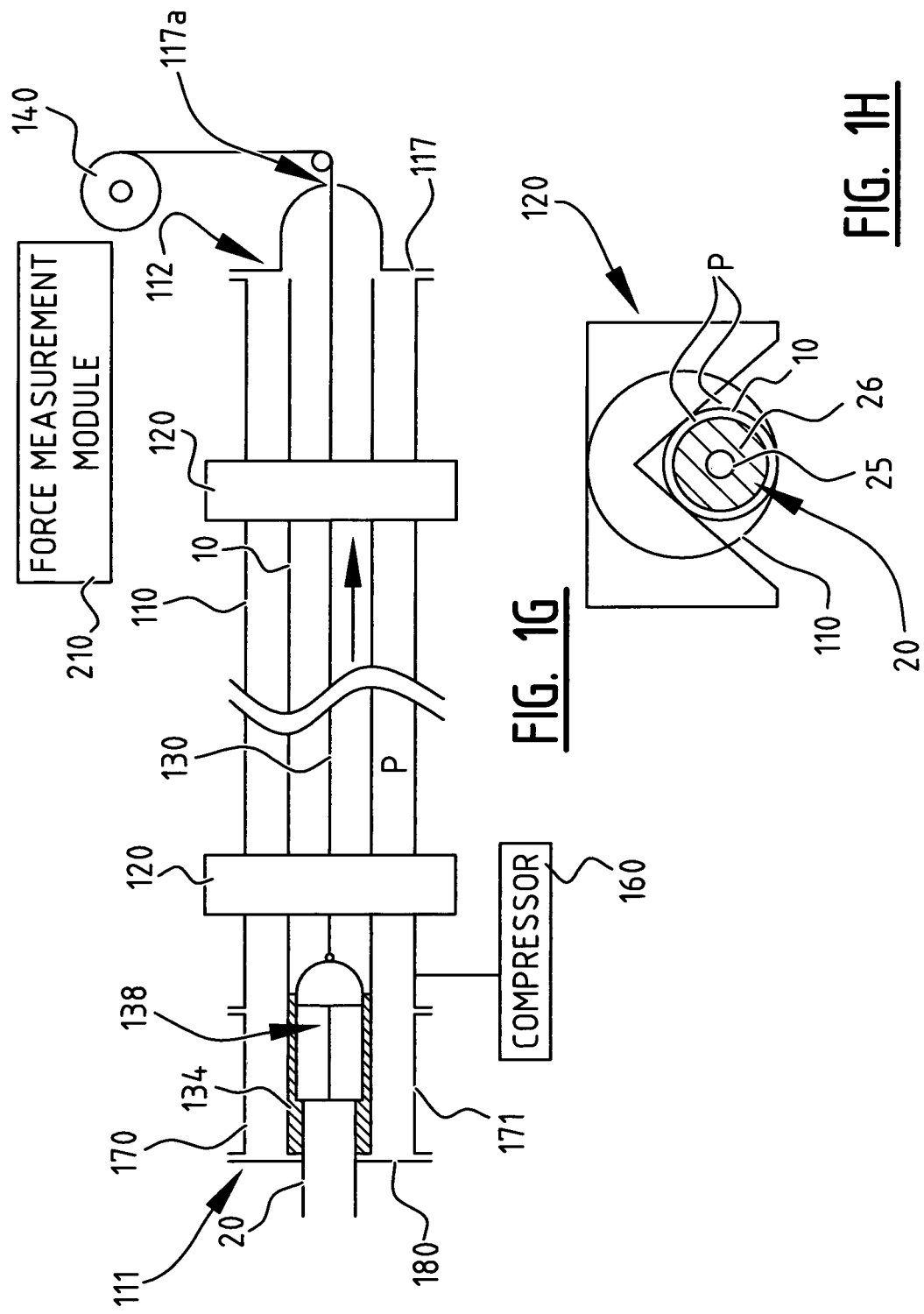

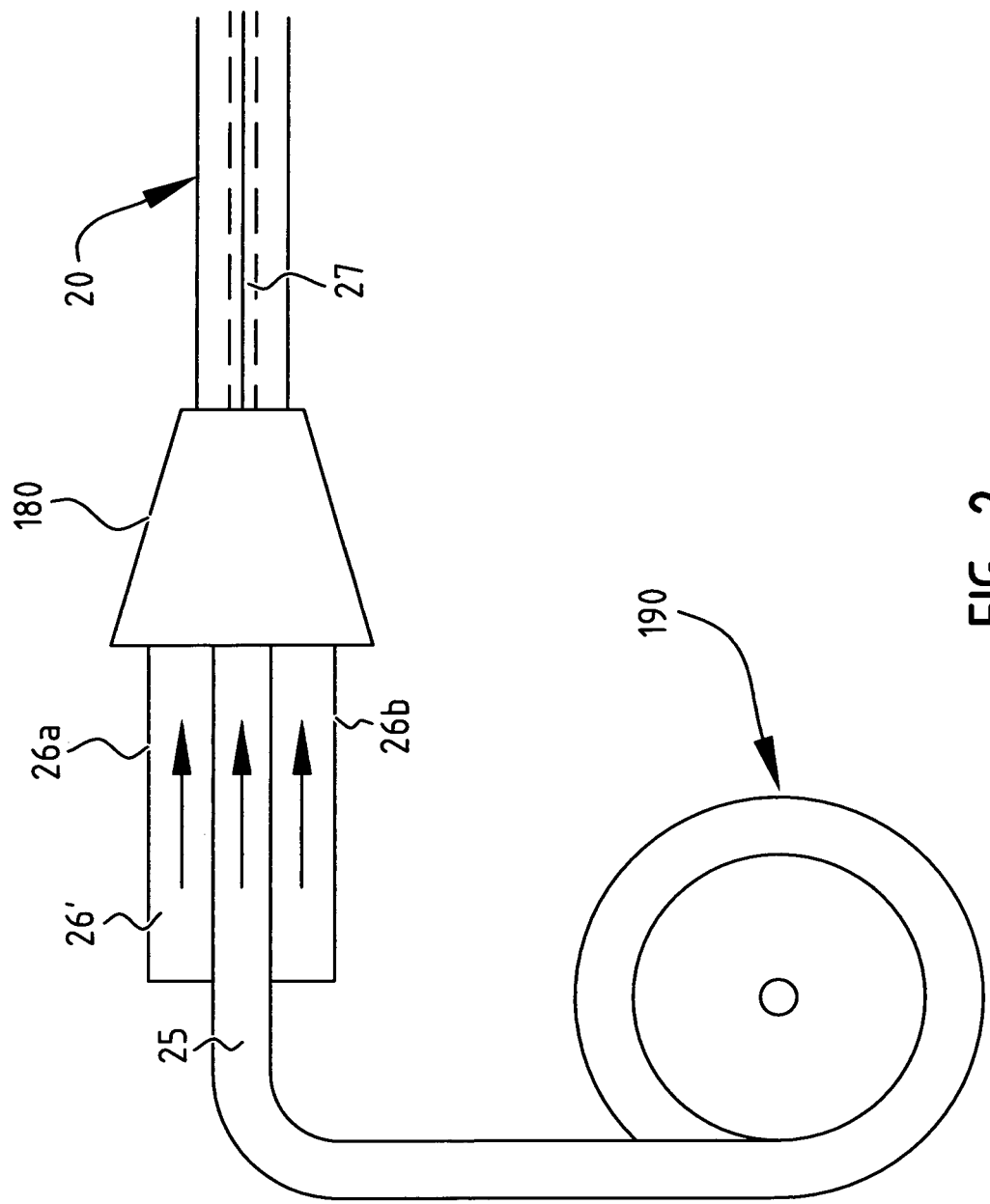

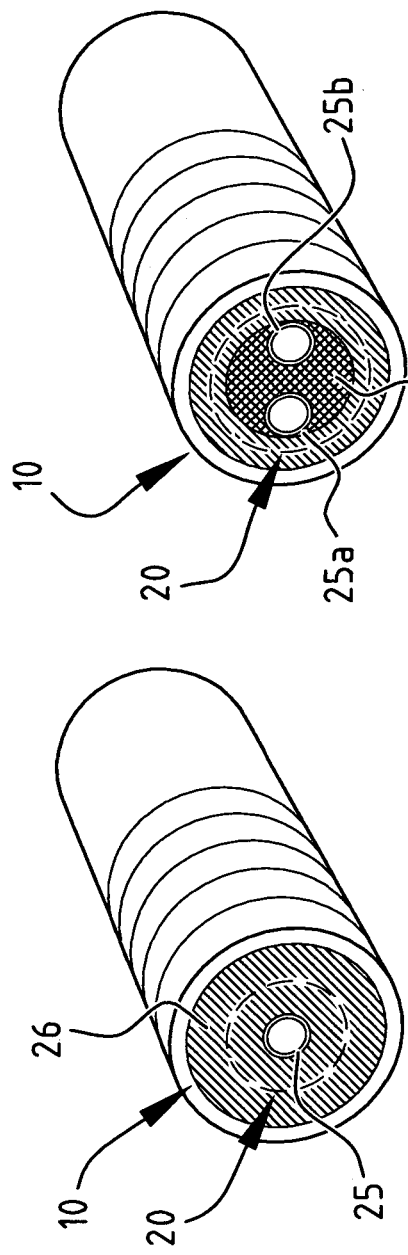
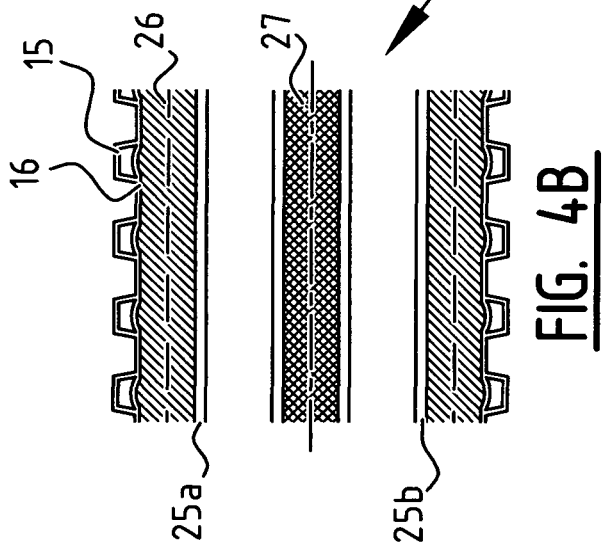
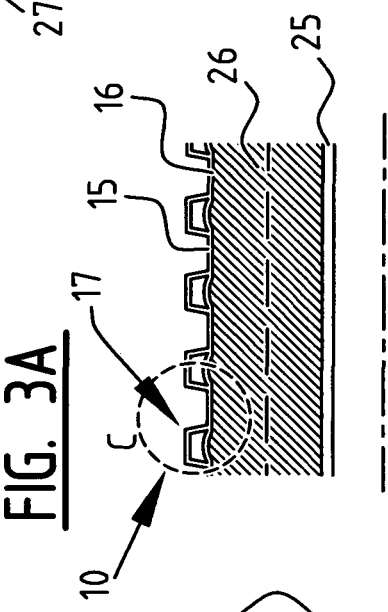
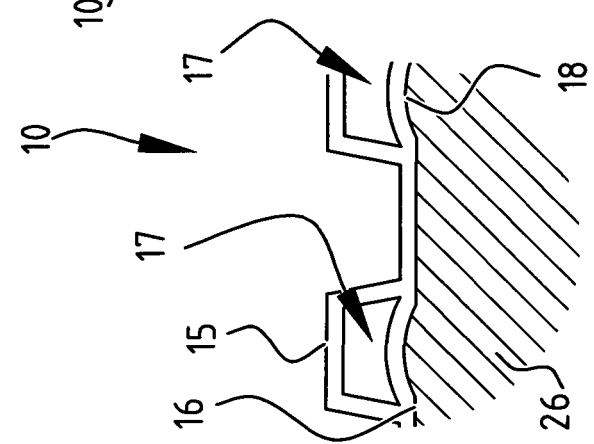
FIG. 3A
FIG. 3B
FIG. 3C
FIG. 4A
FIG. 4B

METHOD AND SYSTEM FOR PRODUCING A PRE-INSULATED PIPE, AND PRE-INSULATED PIPE

FIELD OF INVENTION

The field of the invention relates to a method and system for producing a pre-insulated pipe, and to a pre-insulated pipe obtained by such a method. Particular embodiments relate to a method and system for producing a pre-insulated pipe for heating, sanitary and cooling applications.

BACKGROUND

It is known to arrange an insulated inner piping in a rigid jacket pipe in order to obtain a pre-insulated pipe.

Various pull-through methods exist, in which a pre-insulated pipe is arranged in a jacket pipe by pulling. However, the known methods can only be applied for pipes with a limited length.

Other methods use co-extrusion of the jacket pipe on the insulated inner piping. Such methods have the disadvantage of resulting in pre-insulated pipes that have a limited bending radius.

SUMMARY

The object of embodiments of the invention is to provide an improved method and system for producing a pre-insulated pipe, allowing the production of long flexible pre-insulated pipes.

According to a first aspect of the invention there is provided a method for producing a pre-insulated pipe. The method comprises inserting a length of jacket pipe into a guide channel having a front end and a rear end; fixing said length of jacket pipe in said guide channel; providing a first end of a length of insulated inner piping, said length of insulated inner piping comprising a length of inner pipe surrounded by at least one layer of insulation material; inserting, at said front end of said guide channel, into said length of jacket pipe, said first end of said length of insulated inner piping; applying an overpressure at least around the inserted first end of the length of insulated inner piping, in an interior of said length of jacket pipe; moving said first end of said length of insulated inner piping to said rear end of said guide channel; and removing said overpressure to fix said length of insulated inner piping in said length of jacket pipe in order to form a pre-insulated pipe. The overpressure is such that said at least one layer of insulation material is radially compressed.

According to a second aspect there is provided a system for producing a pre-insulated pipe, comprising a guide channel, fixing means, a pressure generating means and a moving means. The guide channel is configured for receiving a length of jacket pipe, and has a front end and a rear end. The fixing means are configured for fixing the length of jacket pipe in the guide channel. The pressure generating means are configured for applying an overpressure at least in an interior of the length of jacket pipe when, at said front end of said guide channel, a first end of a length of insulated inner piping is inserted into said length of jacket pipe. The length of insulated inner piping comprises a length of inner pipe surrounded by at least one layer of insulation material. The moving means are configured for moving said first end to said rear end of said guide channel.

According to a third aspect there is provided a pre-insulated pipe, in particular a pre-insulated pipe manufactured according to the method of the invention, comprising an insulated inner piping surrounded by a jacket pipe. The insulated inner piping comprises a length of inner pipe surrounded by at least one layer of insulation material. The insulation material is radially elastically compressed and it in contact with the jacket pipe.

Embodiments are based inter alia on the inventive insight that by moving the inner piping in the jacket pipe whilst applying an overpressure to compress the insulation material around the inner pipe, and by fixing the jacket pipe in a guide channel, the insulated inner piping can be moved in more easily and damage to the insulation material can be avoided. In that way long lengths of the pre-insulated pipe of 70 m and more become possible. Also, the method can be easily adapted for pipes with various diameters and thickness and for different types of insulation material. Also the method can be interrupted without influence on the quality of the manufactured pre-insulated pipe.

According to an exemplary embodiment the jacket pipe has a smooth inner surface and a corrugated outer surface. Preferably the jacket pipe is a double walled pipe, with a corrugated outer wall, and a straight inner wall, seen in axial direction. This will allow the pre-insulated pipe to have a small bending radius, as the insulation material can slide over the smooth inner face of the jacket pipe during bending.

According to an exemplary embodiment the pre-insulated pipe has a length which is longer than 50 m, preferably longer than 70 m.

According to an exemplary embodiment the insulated inner piping comprises at least two inner pipes included in a core, said at least one layer of insulation material surrounding said core.

According to an exemplary embodiment the insulated inner piping comprises a cable extending axially adjacent the inner pipe, wherein the inner pipe with the cable is surrounded by the at least one layer of insulation material.

According to an exemplary embodiment the pre-insulated pipe has any one or more of the following features: the jacket pipe has an outer diameter between 50 and 250 mm; the inner pipe has an outer diameter between 20 and 125 mm; the inner pipe has a wall thickness between 1 and 10 mm; the at least one layer of insulation material has a thickness between 10 and 70 mm; the insulation material has a lambda value below 0.050 W/mK; the jacket pipe, the inner pipe and the at least one insulation layer have a length of more than 50 m.

According to an exemplary embodiment the insulation material is a microcellular foam, e.g. a microcellular polyethylene foam. Preferably the insulation material is applied around the inner pipe in the form of sheet material.

According to an exemplary embodiment of the method, the guide channel is a tubular channel, and the overpressure is also applied in the guide channel, outside of said length of jacket pipe. By applying the overpressure both inside and outside the jacket pipe, it is avoided that the jacket pipe, typically a rigid pipe, expands and/or is damaged.

According to an exemplary embodiment, the method further comprises, sealing the front end of the guide channel, between the insulated inner piping and an inlet to the guide channel. Preferably the sealing of an inlet at the front end is provided by means of a seal configured to create an air cushion such that the sealing can be performed with a low amount of friction.

According to an exemplary embodiment an inlet to the guide channel comprises a transparent part, said part being configured for allowing an operator to see the insulated inner piping before it moves into the length of jacket pipe. In that way an operator can monitor the process and take appropriate action if the insulated inner piping does not enter in the jacket pipe as required.

In an exemplary embodiment providing a first end of a length of insulated inner piping comprises sealing said first end, e.g. by arranging a clamp on said first end and applying a tape around the first end. The skilled person understands that other sealing means may be used.

In an exemplary embodiment the method further comprises, after the fixing of the length of jacket pipe in the guide channel, and before the inserting into the length of jacket pipe a length of insulated inner piping: providing a cable at the rear end of the guide channel; said cable having a first end and a second end; said cable being longer than the length of the guide channel; moving said first end of said cable through the interior of the inserted length of jacket pipe from the rear end to the front end. Preferably inserting into said length of jacket pipe a length of insulated inner piping then comprises: connecting a first end of a length of insulated inner piping to said first end of said cable, at the front end; and moving said first end from said front end to said rear end, through the pressurized interior of said length of jacket pipe, by pulling at the second end of the cable from said rear end. Preferably connecting the first end of a length of insulated inner piping to the cable further comprises sealing said first end.

In an exemplary embodiment the first end of a cable is connected to an inner connection piece shaped for moving through the interior of the length of outer jacket pipe; and the moving of said first end of said cable through the interior of the inserted length of jacket pipe comprises sucking said inner connection piece from said rear end to said front end through the interior of the inserted length of jacket pipe.

In an exemplary embodiment inserting into said length of jacket pipe a length of insulated inner piping comprises: fixing a first end of a length of insulated inner piping to a clamp shaped for being moved through the length of jacket pipe; and moving said clamp from said front end to said rear end, through the pressurized interior of said length of jacket pipe. Preferably a cable is used to pull the clamp from the front end to the rear end.

In an exemplary embodiment inserting a length of jacket pipe into the guide channel comprises: providing a cable at the rear end of the guide channel; said cable having a first end and a second end; said cable being longer than the length of the guide channel; moving said first end of said cable through said guide channel from said rear end to said front end; connecting a first end of a length of jacket pipe to said first end of said cable; moving said first end from said front end to said rear end, through said guide channel, by pulling at the second end of the cable from said rear end. Such an embodiment works well for long guide channels. In a preferred embodiment the first end of said cable is connected to a jacket connection piece; and said moving of said first end of said cable comprises sucking said jacket connection piece from said rear end to said front end; and connecting a first end of a length of jacket pipe to said first end of said cable comprises connecting said jacket connection piece to said first end of said cable.

In an exemplary embodiment inserting a length of jacket pipe comprises decoiling the length of jacket pipe from a coil, and cutting off said length of jacket pipe.

In an exemplary embodiment the method further comprises, whilst moving the first end of the length of insulated inner piping to the rear end of the guide channel: decoiling an inner pipe; folding at least one layer of insulation material around said inner pipe whilst decoiling said inner pipe.

In an exemplary embodiment the method further comprises, during the moving of the first end of the length of insulated inner piping to the rear end of said guide channel, measuring a value representative for a force needed for moving said first end of said length of insulated inner piping to said rear end of said guide channel; and regulating the applied overpressure in function of the measured value. In that way the radial compression of the insulation material of the insulated inner piping can be regulated.

In an exemplary embodiment the method further comprises during the moving of the first end of the length of insulated inner piping to the rear end of said guide channel, measuring a value representative for a force needed for moving said first end of said length of insulated inner piping to said rear end of said guide channel; and giving a warning signal and/or stopping the moving when the measured value is higher than a predetermined value. Such a warning signal may be an indication that a seal is no longer working properly, and an operator may then address this problem. The regulating of the previous embodiment may also be included in this embodiment.

In an exemplary embodiment of the system the guide channel is a tubular channel, and the pressure generating means is connected for applying said overpressure in said guide channel, both outside of said length of jacket pipe and in the interior of said length of jacket pipe.

In an exemplary embodiment the system further comprises a sealing device configured for creating a seal between the insulated inner piping and an inlet of the guide channel, whilst moving said first end of said length of insulated inner piping from said front end to said rear end of said guide channel. The sealing device may comprise means for generating a sealing air cushion around the insulated inner piping, such that the sealing is performed with a low amount of friction.

In an exemplary embodiment the system further comprises a winch with cable having a first end and a second end; said cable being longer than the length of the guide channel; said second end being connected to said winch; cable moving means for moving the first end of said cable through the interior of an inserted length of jacket pipe from the rear end to the front end; and a motor for driving said winch in order to pull at the second end of the cable to move the first end of the cable from the front end to the rear end, for pulling the length of insulated inner piping in the length of jacket pipe In an exemplary embodiment the system further comprises an inner connection piece configured for being connected to the first end of the cable and shaped for moving through the interior of the length of outer jacket pipe; wherein said cable moving means comprise a suction means configured for sucking said inner connection piece from said rear end to said front end through the interior of the inserted length of jacket pipe.

In an exemplary embodiment the system further comprises a clamp configured for clamping the first end of the length of insulated inner piping and shaped for moving through the interior of the length of outer jacket pipe from the front end to the rear end.

In an exemplary embodiment the system further comprises a control means configured for controlling the pressure generating means such that said overpressure is applied whilst moving said insulated inner piping and such that said overpressure is removed to fix said length of insulated inner piping in said length of jacket pipe in order to form a pre-insulated pipe.

In an exemplary embodiment the system further comprises the pressure generating means is configured for injecting a gas at least in an interior of the length of jacket pipe when inserted in the guide channel.

In an exemplary embodiment the guide channel has a length which is larger than 50 m, preferably larger than 70 m.

In an exemplary embodiment the system further comprises a number of reels configured for storing a coil of jacket pipe; a coil of inner pipe; and a coil of formed pre-insulated pipe.

In an exemplary embodiment the system further comprises a measurement module configured for measuring a value representative for a force needed for moving said first end of said length of insulated inner piping to said rear end of said guide channel; and a controller configured for controlling the pressure generating means in function of the measured value.

In an exemplary embodiment the system further comprises a measurement module configured for measuring a value representative for a force needed for moving said first end of said length of insulated inner piping to said rear end of said guide channel; and a controller configured for outputting a warning signal and/or for stopping the moving means when the measured value is higher than a predetermined value. The controller may be further configured for controlling the pressure generating means in function of the measured value, as in the previous embodiment.

BRIEF DESCRIPTION OF THE FIGURES

The accompanying drawings are used to illustrate presently preferred non-limiting exemplary embodiments of devices of the present invention. The above and other advantages of the features and objects of the invention will become more apparent and the invention will be better understood from the following detailed description when read in conjunction with the accompanying drawings, in which:

FIG. 2 illustrates schematically an exemplary embodiment of a method for preparing an insulated inner piping;

FIGS. 3A, 3B and 3C illustrate a schematic perspective view, an axial section, and a detailed view of a first exemplary embodiment of a pre-insulated pipe; and FIGS. 4A and 4B illustrate a schematic perspective view and an axial section of a second exemplary embodiment of a pre-insulated pipe.

DESCRIPTION OF EMBODIMENTS

Figure 1:
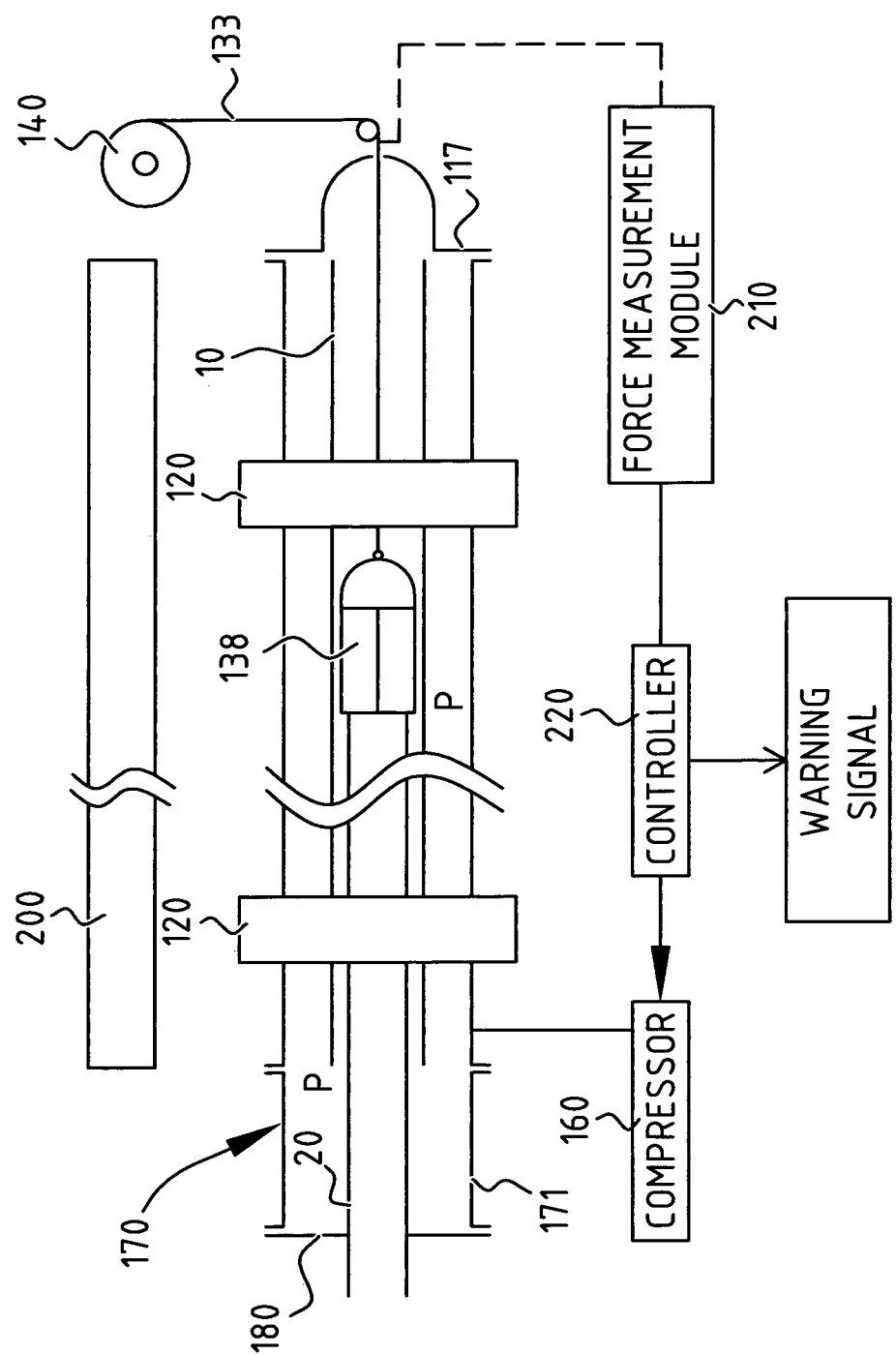
FIGS. 1A-1I illustrate schematically an exemplary embodiment of a method for producing a pre-insulated pipe.

FIGS. 1A-1I illustrate schematically an exemplary embodiment of a method for producing a pre-insulated pipe. FIGS. 1A and 1B illustrate how a length of jacket pipe 10 is inserted into a tubular guide channel 110. The guide channel 110 has a front end 111 and a rear end 112. The length of guide channel 110 is preferably larger than 50 m, more preferably larger than 70 m, and for example between 70 and 110 m. After insertion of the length of jacket pipe 10 in guide channel 110, the jacket pipe is fixed in place using a plurality of fixing modules 120, see also FIG. 1H. FIGS. 1C-1I illustrate the steps of arranging a pulling cable 130 in jacket pipe 10 (FIGS. 1C, 1D and 1E); arranging a clamp 138 at a first end 21 of a length of insulated inner piping 20 (FIG. 1E); connecting clamp 138 to pulling cable 130, and inserting, at the front end 111 of guide channel 110, into the length of jacket pipe 10, said first end 21 of said length of insulated inner piping 20 (FIG. 1G); applying an overpressure at least in an interior of said inserted length of jacket pipe 10 (FIGS. 1G and 1H); and moving said first end 21 from the front end 111 to the rear end 112 of guide channel 110 (FIG. 1I). In a final non illustrated step the overpressure is removed to fix the length of insulated inner piping 20 in the length of jacket pipe 10 in order to form a pre-insulated pipe.

FIGS. 1A and 1B illustrate how a length of jacket pipe 10 is inserted into a guide channel 110. In FIG. 1A a cable 130 is provided at the rear end 112 of guide channel 110. Cable 130 has a first end 131 and a second end connected to a winch 140. Cable 130 is longer than the length of guide channel 110. The first end 131 of cable 130 is connected to a jacket connection piece 135. The first end 131 of cable 130 is moved through guide channel 110 from the rear end 112 to the front end 111 by sucking jacket connection piece 135 from the rear end 112 to the front end 111 using a suction pump 150 which is connected at the front end 111 to create an underpressure in guide channel 110, between the front end 111 and jacket connection piece 135. During the sucking the front end 111 is closed with a door 115. The jacket connection piece 135 is shaped for creating a barrier in guide channel 100 such that it can be sucked. Next, as illustrated in FIG. 1B, a first end 11 of a length of jacket pipe 10 is connected to jacket connection piece 135. To that end jacket connection piece 135 may be provide with a front portion 135a which fits in the first end 11 of the jacket pipe 10. Front portion 135a may be provided with a bore 133 for a pin 136 in order to fix the first end 11 of the jacket pipe 10 to the jacket connection piece 135. The pin 136 extends through the wall of the first end 11 of jacket pipe 10, and through the bore 133. Next the first end 11 is moved from the front end 111 to the rear end 112, through guide channel 110, by pulling at the second end of cable 130 using winch 140. Inserting the length of jacket pipe 10 may comprise decoiling the length of jacket pipe 10 from a coil (not shown). FIG. 1C illustrates the situation where the length of jacket pipe 10 is in place in guide channel 110. If the length of jacket pipe 10 is decoiled, a further step may consist in cutting off the length of jacket pipe 10. Now the fixation modules 120 may be operated to clamp the length of jacket pipe 10 at a plurality of positions in the guide channel, e.g. every 5 meters. In an exemplary embodiment the fixation module may comprise a clamping piece that can be lowered in guide channel 110, to clamp the jacket pipe 10, see also FIG. 1H.

Next, as illustrated in FIG. 1C, jacket connection piece 135 may be decoupled, and the first end 131 of cable 130 is connected to an inner connection piece 137 shaped for moving through the interior of the length of outer jacket pipe 10. The first end 131 of cable 130 is moved through the interior of the inserted length of jacket pipe 10 from rear end 112 to front end 111 by sucking inner connection piece 137 from said rear end 112 to said front end 111 through the interior of the inserted length of jacket pipe 10 using a suction pump 150 connected through a suction conduit 151 to the front end 11 of jacket pipe 10, see FIG. 1D. As set out below, there may be provided with a door 117 to seal the rear end 112 of the guide channel 110. Door 117 may remain open during the sucking of inner connection piece 137 in order to avoid a negative pressure in the jacket pipe 10 at the side of the rear end 12. Alternatively, there may be provided a ventilation device in door 117 which can be sealed when the door 117 needs to seal the rear end 112, see further. When an operator hears that the inner connection piece 137 arrives at the front end 111 of guide channel 110, he may disconnect suction conduit 151 connecting pump 150 to the front end 11 of jacket pipe 10. In that way cable end 131 is available at the front end 111, whilst cable 130 extends through jacket pipe 10, see FIG. 1E. Now inner connection piece 137 may be disconnected and transported, e.g. via a transport system 200, back to the rear end 112 such that it is available at the rear end 112 for the next pre-insulated pipe to be manufactured.

Then a first end 21 of a length of insulated inner piping 20 is inserted into the length of jacket pipe 10 as follows, see FIGS. 1F-1H. The length of insulated inner piping 20 comprises a length of inner pipe 25 surrounded by at least one layer of insulation material 26. The first end 21 of the length of insulated inner piping 20 is connected to a clamp 138. The skilled person understands that this step may be performed beforehand, i.e. before moving inner connection piece 137 from the rear end 112 to the front end 111 and even before arranging jacket pipe 10 in guide channel 110. Clamp 138 is shaped to grip firmly around the at least one layer of insulation material 26. The clamp 138 may comprise two shells 138a, 138b which grip around the insulation material 26 and grip around the first end 21 and/or compress the first end 21 radially, see FIG. 1F. The fixation may be enhanced by radially drilling a through-hole 23 in the first end 21, through inner pipe 25, and arranging a pin 139 in said through-hole 23. If the insulated inner piping 20 comprises two inner pipes, see e.g. the embodiment of FIG. 4A, the through-hole 23 may extend through the two inner pipes 25. This pin 139 is received in holes in the inner surface of the clamp shells 138a, 138b. In that way it can be avoided that the first end 21 becomes loose when pulled through the length of jacket pipe 10. In addition the inner surfaces of the clamp shells 138a, 138b may be provided with claws that grip into the insulation layer 26 at the first end 21 of the length of inner piping 20. After arranging the clamp 138, the sealing may be further improved by arranging a tape 134 around the clamp 138 and the inner piping 20 (the tape 134 is visible in FIG. 1G). Then the clamp 138 connected to the length of inner piping 20 is connected to cable end 131 and inserted in length of jacket pipe 10, at the front end 111.

An inlet piece 170 with a transparent wall part 171 is arranged at the front end 111 as a prolongation of guide channel 110, see FIG. 1G. This transparent wall part 171 is configured for allowing an operator to see the insulated inner piping 20 before it moves into the length of jacket pipe 10. At the front end 111 there is provided a seal 180 between the insulated inner piping 20 and an inlet of the inlet piece 170. At the rear end 112 a clock shaped door 117 is closed to seal the rear end 112 of guide channel 110, wherein a small opening 117a is arranged in the clock shaped door for allowing the cable 130 to pass through the door. The shape of door 117 is adapted to the shape of the clamp 138, such that the clamp 138 can be received in the door 117 when reaching the rear end 112. Door 117 has not been drawn in FIGS. 1A and 1B, but a skilled person understands that also in those steps door 117 may be present. Now an internal overpressure P is applied in guide channel 110, using a compressor 160, such that overpressure P is present around the insulated inner piping 20 in jacket pipe 10 and around the length of jacket pipe 10. See FIG. 114 and if. Next the first end 21 is pulled from the front end 111 to the rear end 112, through the pressurized part of the length of jacket pipe 10, by pulling at the second end of the cable 130 using winch 140. The overpressure P is such that said at least one layer 26 of insulation material is radially compressed, whereby it is avoided that the insulation material is damaged during the pull-through process. Preferably, the length of insulated inner piping 20 is moved into the length of jacket pipe 10 using a pre-determined velocity and/or using a pre-determined force. The overpressure P is preferably higher than 300 mbar, more preferable higher than 400 mbar, and most preferably higher than 450 mbar. The overpressure P may be set in function of the properties of the insulated inner piping 20. The overpressure P is preferably chosen between 300 mbar and 1000 mbar.

The seal 180 at the inlet may be provided by means of a seal configured to create an air cushion around the moving length of insulated inner piping 20, such that the sealing can be performed with a low amount of friction. In that way it can be avoided that the seal 180 wears whilst the length of insulated inner piping 20 is pulled in. This seal 180 may be adjusted in function of the diameter of the insulated inner piping 20.

In order to determine whether seal 180 is working in a normal sealing mode, the pulling force needed for pulling cable 130 through the jacket pipe may be measured, e.g. using a force measurement means 210, e.g. integrated in a motor of coil 140. This pulling force will be relatively low when the sealing by seal 180 is excellent, since in that case the overpressure will compress the insulating material in a sufficient manner, resulting in relatively low friction between jacket pipe 10 and the assembly of the clamp 118 and the insulated inner piping that is being pulled through the jacket pipe 10. When the sealing by seal 118 deteriorates, the required pulling force will increase. This increase of the pulling force may be used to generate a warning indication that the seal 180 needs to be checked, e.g. via a controller 220. Also, the pulling force measured by the force measurement module 210 may be used to regulate the compression of the insulation material of the insulated inner piping 20, i.e. to control the compressor 160. The compressor 160 may be controlled by a controller 220 to increase pressure P when the measured pulling force is too high, see also FIG. 1I. In normal operation the pulling force may be e.g. between 300 kg and 1000 kg.

When the pull-through process is finished the clamp 138 can be decoupled from cable 130 and from insulated inner piping 20. Clamp 138 may be transported back to the front end 111 using transport system 200. The formed pre-insulated pipe may be removed from guide channel 110, and optionally the pre-insulated pipe may be coiled.

For manufacturing the insulated inner piping 20, there may be provided an additional wrapping station for arranging the at least one layer of insulating material 26 around an inner pipe 25. Such a station may be provided before the inlet of inlet piece 170 shown in FIG. 1I. A process for arranging the at least one layer of insulating material 26 around an inner pipe 25 is illustrated in FIG. 2. The process comprises decoiling an inner pipe 25 from a coil 190; and folding at least one sheet of insulation material 26' around said inner pipe 25 whilst decoiling said inner pipe 25, by moving the inner pipe 25 and the at least one sheet of insulation material 26' through a funnel shaped device 180. The insulation sheet material 26' may be unwound from a roll. For ensuring a good connection between the edges 26a, 26b of the at least one sheet of insulation material 26' there may be arranged a tape 27 on the interface between the two edges 26a, 26b. The tape 27 may also be applied from a roll. These operations (decoiling, advancing the insulation sheet material 26', advancing the tape 27) may be performed at the same speed as the speed at which the insulated inner piping 20 is pulled into the length of jacket pipe 10.

FIGS. 3A, 3B and 3C illustrate a first embodiment of a pre-insulated pipe obtained in accordance with a method of the invention. The pre-insulated pipe comprises a jacket pipe 10 and an insulated inner piping 20. Jacket pipe 10 has a smooth inner surface 16 and a corrugated outer surface 15. Jacket pipe 10 may be a twin wall pipe formed as an assembly of a corrugated outer wall and a straight inner wall, such that the jacket pipe 10 has hollow ribs 17. FIG. 3C shows a detail of the longitudinal section of FIG. 3B. Here it can be seen that, because of the fact that the insulation material 26 is compressed, the jacket pipe 10 may show curved portions 18 at the position of the hollow ribs 17. Insulated inner piping 20 comprises a length of inner pipe 25 surrounded by at least one layer of insulation material 26, wherein the insulation material 26 is radially elastically compressed. The compression may be such that if the jacket pipe 10 were to be cut open, the insulation material 26 expands radially, e.g. over a distance which is higher than 0.05 mm, or higher than 0.5 mm, or higher than 1 mm or higher than 2 mm.

The inner pipe 25 may be manufactured from rigid plastic material such as a PE material, e.g. PE-Xa (i.e. polyethylene with cross-linked adjacent chains, produced by the peroxide or Engel process). An oxygen diffusion barrier may be included in the inner pipe 25. The jacket pipe 10 may be a twin wall pipe, e.g. made from a PE material. The at least one layer of insulation material 26 may be made of a PE foam, preferably a microcellular cross-linked PE foam.

In the exemplary embodiments of FIGS. 3A-3C there is provided insulation material 26 between the jacket pipe 10 and the inner pipe 25. The skilled person understands that this insulation material may be provided as a number of layers of insulation material surrounding the inner pipe, as indicated in dotted lines in FIG. 3A and FIG. 3B.

The pre-insulated pipe of FIG. 3A and FIG. 3B may have any one or more of the following features: the jacket pipe 10 has an outer diameter between 50 and 250 mm; the inner pipe 25 has an outer diameter between 20 and 125 mm; the inner pipe 25 has a wall thickness between 1 and 10 mm; the at least one layer of insulation material 26 has a thickness between 10 and 70 mm; the insulation material 26 has a lambda value below 0.050 W/mK; the jacket pipe 10, the inner pipe 25 and the at least one insulation layer 26 have a length of more than 50 m.

EXAMPLE

An example of the pre-insulated pipe of FIG. 3A and FIG. 3B is intended as a pipe for transporting fluids, in particular hot fluids, and it has the following features:
Inner pipe 25 made of PE-Xa in accordance with EN ISO 15875 with an oxygen barrier in accordance with DIN 4726;
Insulation material 26 made of thermal, elastic, CFC-free foam made of cross-linked PE-X with a closed microcellular structure;
Jacket pipe 10 in the form of a corrugate outer casing in HDPE, made in accordance with a closed chamber principle to provide high-grade protection of the pre-insulated pipe.
Examples of sizes and properties are:
1. The jacket pipe 10 has an outer diameter of 75 mm; the inner pipe 25 has an outer diameter of 25 mm; the inner pipe 25 has a wall thickness of 2.3 mm; the bending radius of the pre-insulated pipe is between 0.15 m and 0.25 m; the weight of the pre-insulated pipe is between 0.6 and 0.8 kg/m; the average heat emission at a water temperature of 80° C. and a temperature difference of 20° C. is between 25 and 35 kW.
2. The jacket pipe 10 has an outer diameter of 160 mm; the inner pipe 25 has an outer diameter of 40 mm; the inner pipe 25 has a wall thickness of 3.7 mm; the bending radius of the pre-insulated pipe is between 0.30 m and 0.35 m; the weight of the pre-insulated pipe is between 2.20 and 2.40 kg/m; the average heat emission at a water temperature of 80° C. and a temperature difference of 20° C. is between 80 and 100 kW.
3. The jacket pipe 10 has an outer diameter of 200 mm; the inner pipe 25 has an outer diameter of 125 mm; the inner pipe 25 has a wall thickness of 11.4 mm; the bending radius of the pre-insulated pipe is between 1.2 m and 1.6 m; the weight of the pre-insulated pipe is between 2.20 and 2.40 kg/m; the average heat emission at a water temperature of 80° C. and a temperature difference of 20° C. is between 800 and 1000 kW.

FIGS. 4A and 4B illustrate a second embodiment of a pre-insulated pipe obtained in accordance with a method of the invention. The pre-insulated pipe comprises a jacket pipe 10 and an insulated inner piping 20. Jacket pipe 10 has a smooth inner surface 16 and a corrugated outer surface 15. Jacket pipe 10 may be a twin wall pipe formed as an assembly of a corrugated outer wall and a straight inner wall, such that the jacket pipe 10 has hollow ribs. Insulated inner piping 20 comprises two inner pipes 25a, 25b surrounded by at least one layer of insulation material 26, wherein the insulation material 26 is radially elastically compressed. The two inner pipes 25a, 25b are included in a core 27, also called dogbone, and the at least one layer of insulation material 26 surrounds core 27. The skilled person understands that more than two inner pipes may be provided in the dogbone.

In the exemplary embodiments of FIGS. 4A and 4B there is provided insulation material 26 between jacket pipe 10 and dogbone 27. The skilled person understands that this insulation material 26 may be provided as a number of layers of insulation material surrounding the inner pipe, as indicated in dotted lines in FIG. 4A and FIG. 4B.

The pre-insulated pipe of FIG. 4A and FIG. 4B may have any one or more of the following features: the jacket pipe 10 has an outer diameter between 100 and 250 mm; the inner pipes 25a, 25b have an outer diameter between 20 and 100 mm; the inner pipes 25a, 25b have a wall thickness between 1 and 10 mm; the at least one layer of insulation material 26 has a thickness between 10 and 70 mm; the insulation material 26 has a lambda value below 0.050 W/mK; the jacket pipe 10, the inner pipe 25 and the at least one insulation layer 26 have a length of more than 50 m.

EXAMPLE

An example of the pre-insulated pipe of FIG. 4A and FIG. 4B is intended as a pipe for transporting fluids, in particular hot fluids, and has the following features:
Inner pipes 25a, 25b made of PE-Xa in accordance with EN ISO 15875 with an oxygen barrier in accordance with DIN 4726;
Dogbone 27 made of CFC-free closed-cell, cross-linked polyethylene foam;
Insulation material 26 made of thermal, elastic, CFC-free foam made of cross-linked PE-X with a closed microcellular structure;
Jacket pipe 10 in the form of a corrugate outer casing in HDPE, made in accordance with a closed chamber principle to provide high-grade protection of the pre-insulated pipe.

Examples of sizes and properties are:
1. The jacket pipe 10 has an outer diameter of 160 mm; the inner pipes 25a, 25b have an outer diameter of 25 mm; the inner pipes 25a, 25b have a wall thickness of 2.3 mm; the bending radius of the pre-insulated pipe is between 0.4 m and 0.6 m; the weight of the pre-insulated pipe is between 2.1 and 2.3 kg/m; the average heat emission at a water temperature of 80° C. and a temperature difference of 20° C. is between 25 and 35 kW. The pressure P that is being applied in the step of FIG. 1G discussed above to make a pre-insulated pipe with the properties of example 2, may be e.g. between 450 and 550 mbar, preferably between 475 and 525 mbar. The pulling force in the step of FIG. 1G discussed above, during normal operation, may be e.g. between 450 and 550 kg.
2. The jacket pipe 10 has an outer diameter of 160 mm; the inner pipes 25a, 25b have an outer diameter of 40 mm; the inner pipes 25a, 25b have a wall thickness of 3.7 mm; the bending radius of the pre-insulated pipe is between 0.5 m and 0.7 m; the weight of the pre-insulated pipe is between 2.5 and 2.7 kg/m; the average heat emission at a water temperature of 80° C. and a temperature difference of 20° C. is between 80 and 100 kW. The pressure P that is being applied in the step of FIG. 1G discussed above to make a pre-insulated pipe with the properties of example 2, may be e.g. between 500 and 600 mbar, preferably between 525 and 575 mbar. The pulling force in the step of FIG. 1G discussed above, during normal operation, may be e.g. between 550 and 650 kg.
3. The jacket pipe 10 has an outer diameter of 200 mm; the inner pipes 25a, 25b have an outer diameter of 63 mm; the inner pipes 25a, 25b have a wall thickness of 5.8 mm; the bending radius of the pre-insulated pipe is between 1.1 m and 1.3 m; the weight of the pre-insulated pipe is between 4.5 and 4.8 kg/m; the average heat emission at a water temperature of 80° C. and a temperature difference of 20° C. is between 200 and 240 kW.

It should be appreciated by those skilled in the art that any block diagrams herein represent conceptual views of illustrative components embodying the principles of the invention.

Whilst the principles of the invention have been set out above in connection with specific embodiments, it is to be understood that this description is merely made by way of example and not as a limitation of the scope of protection which is determined by the appended claims.

The invention claimed is:

1. A method for producing a pre-insulated pipe, comprising:
   inserting a length of jacket pipe into a guide channel having a front end and a rear end;
   fixing said length of jacket pipe in said guide channel using a plurality of fixation modules at a plurality of positions between the front end and the rear end of the guide channel;
   providing a first end of a length of insulated inner piping, said length of insulated inner piping comprising a length of inner pipe surrounded by at least one layer of compressible insulation material;
   inserting, at said front end of said guide channel, into said length of jacket pipe, said first end of said length of insulated inner piping;
   applying an overpressure at least in an interior of said length of jacket pipe, around the inserted first end of the length of insulated inner piping;
   moving said first end of said length of insulated inner piping to said rear end of said guide channel, wherein said overpressure is such that said at least one layer of insulation material is radially compressed; and
   removing said overpressure to fix said length of insulated inner piping in said length of jacket pipe in order to form a pre-insulated pipe.

2. A method for producing a pre-insulated pipe, comprising:
   inserting a length of jacket pipe into a guide channel having a front end and a rear end;
   fixing said length of jacket pipe in said guide channel;
   providing a first end of a length of insulated inner piping, said length of insulated inner piping comprising a length of inner pipe surrounded by at least one layer of compressible insulation material;
   inserting, at said front end of said guide channel, into said length of jacket pipe, said first end of said length of insulated inner piping;
   applying an overpressure at least in an interior of said length of jacket pipe, around the inserted first end of the length of insulated inner piping;
   moving said first end of said length of insulated inner piping to said rear end of said guide channel, wherein said overpressure is such that said at least one layer of insulation material is radially compressed; and
   removing said overpressure to fix said length of insulated inner piping in said length of jacket pipe in order to form a pre-insulated pipe,
   wherein said guide channel is a tubular channel, and said overpressure is also applied in said guide channel, outside of said length of jacket pipe which is fixed between said front end and said rear end of said guide channel.

3. A method for producing a pre-insulated pipe, comprising:
   inserting a length of jacket pipe into a guide channel having a front end and a rear end;
   fixing said length of jacket pipe in said guide channel;
   providing a first end of a length of insulated inner piping, said length of insulated inner piping comprising a length of inner pipe surrounded by at least one layer of compressible insulation material;
   inserting, at said front end of said guide channel, into said length of jacket pipe, said first end of said length of insulated inner piping;
   applying an overpressure at least in an interior of said length of jacket pipe, around the inserted first end of the length of insulated inner piping;
   moving said first end of said length of insulated inner piping to said rear end of said guide channel; wherein said overpressure is such that said at least one layer of insulation material is radially compressed; and whilst moving said first end of said length of insulated inner piping to said rear end of said guide channel: sealing the front end of the guide channel, between the insulated inner piping and an inlet to the guide channel; and
   removing said overpressure to fix said length of insulated inner piping in said length of jacket pipe in order to form a pre-insulated pipe.

4. The method of claim 3, wherein said sealing the front end is using a seal configured to create an air cushion around the length of insulated inner piping.

5. The method of claim 3, wherein said inlet comprises a transparent part, said part being configured for allowing an operator to see the insulated inner piping before it moves into the length of jacket pipe.

6. The method of claim 1, further comprising, after the fixing of the length of jacket pipe in the guide channel, and before the inserting into the length of jacket pipe a length of insulated inner piping:
providing a cable at the rear end of the guide channel; said cable having a first end and a second end, said cable being longer than the length of the guide channel; and
moving said first end of said cable through the interior of the inserted length of jacket pipe from the rear end to the front end,
wherein inserting into said length of jacket pipe a length of insulated inner piping comprises:
connecting a first end of a length of insulated inner piping to said first end of said cable, at the front end; and
moving said first end from said front end to said rear end, through the pressurized interior of said length of jacket pipe, by pulling at the second end of the cable from said rear end.

7. The method of claim 1, wherein inserting into said length of jacket pipe a length of insulated inner piping comprises:
fixing a first end of a length of insulated inner piping to a clamp shaped for being moved through the length of jacket pipe; and
moving said clamp from said front end to said rear end, through the pressurized interior of said length of jacket pipe.

8. The method of claim 1, wherein inserting a length of jacket pipe into the guide channel comprises:
providing a cable at the rear end of the guide channel, said cable having a first end and a second end, said cable being longer than the length of the guide channel;
moving said first end of said cable through said guide channel from said rear end to said front end;
connecting a first end of a length of jacket pipe to said first end of said cable; and
moving said first end from said front end to said rear end, through said guide channel, by pulling at the second end of the cable from said rear end.

9. The method of claim 8, wherein said first end of said cable is connected to a jacket connection piece,
wherein said moving of said first end of said cable comprises sucking said jacket connection piece from said rear end to said front end, and
wherein connecting a first end of a length of jacket pipe to said first end of said cable comprises connecting said jacket connection piece to said first end of said cable.

10. The method of claim 1, wherein inserting a length of jacket pipe comprises decoiling the length of jacket pipe from a coil, and cutting off said length of jacket pipe.

11. The method of claim 1, further comprising, whilst moving the first end of the length of insulated inner piping to the rear end of the guide channel:
decoiling an inner pipe; and
folding at least one layer of insulation material around said inner pipe whilst decoiling said inner pipe.

12. The method of claim 1, wherein said applying of an overpressure is performed by injecting a gas under pressure in at least the interior of the length of jacket pipe.

13. The method of claim 1, wherein said length of insulated inner piping is moved into said length of jacket pipe using a pre-determined velocity and/or using a pre-determined force.

14. The method of claim 1, wherein said length of jacket pipe has a smooth inner surface and a corrugated outer surface.

15. The method of claim 1, wherein said length of jacket pipe is a double walled pipe.

16. The method of claim 1, wherein said length of insulated inner piping comprises at least two layers of insulation material.

17. The method of claim 1, wherein the length of jacket pipe and/or the length of insulated inner piping are/is larger than 50 m, preferably larger than 70 m.

18. The method of claim 1, comprising:
removing the formed pre-insulated pipe from said guide channel; and
coiling said pre-insulated pipe.

19. The method of claim 1, wherein during the moving of the first end of the length of insulated inner piping to the rear end of said guide channel, a value representative for a force needed for moving said first end of said length of insulated inner piping to said rear end of said guide channel, is measured, and wherein the applied overpressure is regulated in function of the measured value.

20. The method of claim 1, wherein during the moving of the first end of the length of insulated inner piping to the rear end of said guide channel, a value representative for a force needed for moving said first end of said length of insulated inner piping to said rear end of said guide channel, is measured, and wherein a warning signal is given and/or the moving is stopped, when the measured value is higher than a predetermined value.

* * * * *